(12) United States Patent
Ruggiero et al.

(10) Patent No.: US 8,028,996 B2
(45) Date of Patent: Oct. 4, 2011

(54) SYSTEM AND METHOD FOR ADJUSTING STIFFNESS OF A BRUSH SEALING SYSTEM

(75) Inventors: Eric John Ruggiero, Rensselaer, NY (US); Roderick Mark Lusted, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 664 days.

(21) Appl. No.: 12/062,642

(22) Filed: Apr. 4, 2008

(65) Prior Publication Data
US 2009/0250879 A1 Oct. 8, 2009

(51) Int. Cl.
F16J 15/44 (2006.01)
(52) U.S. Cl. ........................................................ 277/355
(58) Field of Classification Search .................... 277/355
See application file for complete search history.

(56) References Cited

U.S. PATENT DOCUMENTS

| 885,032 | A | * | 4/1908 | Ferranti | 415/173.6 |
|---|---|---|---|---|---|
| 5,106,104 | A | * | 4/1992 | Atkinson et al. | 277/303 |
| 5,568,931 | A | * | 10/1996 | Tseng et al. | 277/355 |
| 5,597,167 | A | * | 1/1997 | Snyder et al. | 277/355 |
| 6,308,957 | B1 | * | 10/2001 | Wright | 277/355 |
| 6,382,632 | B1 | * | 5/2002 | Chupp et al. | 277/355 |
| 6,402,157 | B1 | * | 6/2002 | Zhou et al. | 277/355 |
| 6,536,773 | B2 | * | 3/2003 | Datta | 277/355 |
| 6,550,777 | B2 | * | 4/2003 | Turnquist et al. | 277/355 |
| 6,799,766 | B2 | * | 10/2004 | Crudgington et al. | 277/355 |
| 6,913,265 | B2 | * | 7/2005 | Datta | 277/355 |
| 7,000,923 | B2 | | 2/2006 | Addis | |
| 7,226,054 | B2 | * | 6/2007 | Addis | 277/355 |
| 7,604,241 | B2 | * | 10/2009 | Kowalczyk | 277/355 |
| 2002/0130469 | A1 | * | 9/2002 | Kono | 277/355 |
| 2003/0030220 | A1 | * | 2/2003 | Datta | 277/355 |
| 2004/0119237 | A1 | * | 6/2004 | Datta | 277/355 |
| 2005/0151323 | A1 | | 7/2005 | Addis | |
| 2006/0192343 | A1 | * | 8/2006 | Hashiba et al. | 277/355 |
| 2007/0063448 | A1 | * | 3/2007 | Kowalczyk | 277/355 |
| 2008/0007008 | A1 | * | 1/2008 | Hoebel et al. | 277/355 |
| 2008/0315529 | A1 | * | 12/2008 | Addis | 277/355 |
| 2009/0250879 | A1 | * | 10/2009 | Ruggiero et al. | 277/355 |

FOREIGN PATENT DOCUMENTS

| EP | 1070887 A2 | 1/2001 |
|---|---|---|
| WO | 99/06673 A | 2/1999 |

* cited by examiner

*Primary Examiner* — Alison Pickard
(74) *Attorney, Agent, or Firm* — Ann M. Agosti

(57) ABSTRACT

A brush sealing system includes a plurality of bristles, each having a first end coupled to a holding device and a second end protruding outwards from the holding device. One or more shims are disposed between the first end of each of the bristles and the holding device; wherein the shims are configured to controlling a pinch point diameter of the bristles.

16 Claims, 4 Drawing Sheets

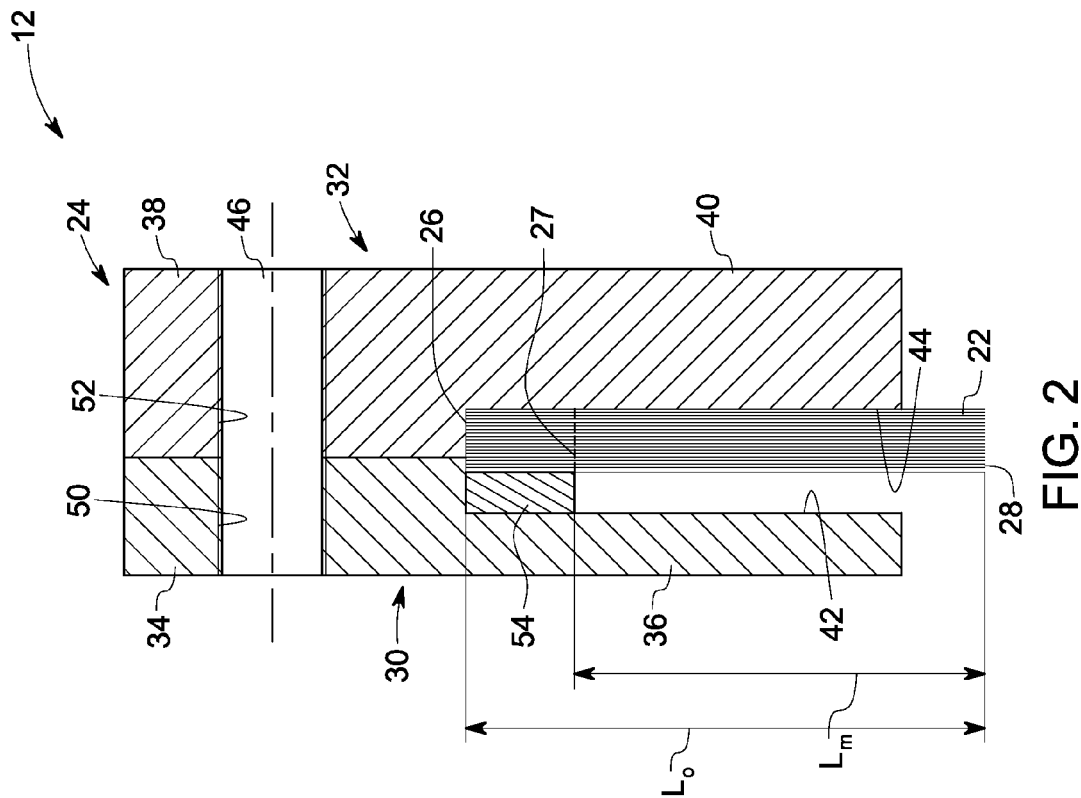
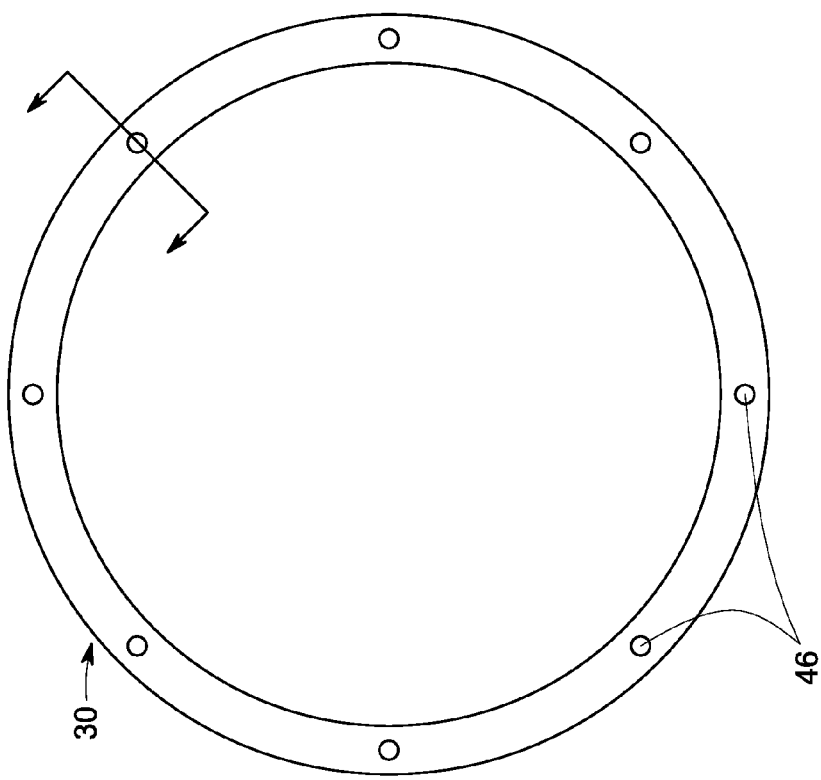
FIG. 2
FIG. 3

SYSTEM AND METHOD FOR ADJUSTING STIFFNESS OF A BRUSH SEALING SYSTEM

BACKGROUND

The invention relates generally to a brush sealing system and a method for adjusting stiffness of a brush sealing system.

Efficiency of rotary machines utilized for pumping a fluid or compressing or expanding a vapor (e.g. gas) depends upon the internal tolerances of the components comprising the machine. A loosely-toleranced rotary machine may have a relatively poor fit between internal components and may therefore exhibit poor efficiency, with relatively high leakage occurring within the device from regions of higher pressure to regions of lower pressure. The traditional approach to this situation is to decrease the amount of clearance on these critical interfaces.

Sealing systems are used in rotary machines to reduce leakage of fluid flowing through the rotary machines. One or more seals extend along an interface between rotating and stationary components. One type of seal, referred to as a brush seal, uses a plurality of bristles held in place across the area to be sealed. One environment in which brush seals are commonly used is within gas turbine engines of the type used for providing propulsion to aircraft, auxiliary power to aircraft or other moving vessels, or in land based power generation embodiments. For example, the brush seal may be used between a gap formed between a stationary part such as a diffuser, engine casing, or stator, and a rotating part, such as a turbine blade, shaft, or rotor.

The manufacturing cycle for a brush seal typically occurs over several weeks. During the design process of a brush seal, various parameters are set with one example being a pinch point diameter of the brush seal. The pinch point diameter affects the seal's stiffness and heat generation capability. A pinch point diameter of a brush seal must be fixed during early stages of the design process of the brush seal because, if any design changes are requested during fabrication, the seal cannot readily be altered.

Accordingly, there is a need for a system and method that facilitates greater flexibility for adjusting a pinch point diameter of a brush seal during later stages of manufacturing and post manufacturing stages.

BRIEF DESCRIPTION

In accordance with one exemplary embodiment of the present invention, a method of manufacturing a brush sealing system includes coupling a first end of each of a plurality of bristles into a holding device with a second end of each of the plurality of bristles protruding outwards from the holding device. The method also includes disposing one or more shims between the holding device and the first ends of the plurality of bristles.

In accordance with another exemplary embodiment of the present invention, a method of adjusting a pinch point diameter of a brush sealing system is disclosed. The method includes altering the pinch point diameter of the plurality of bristles by adding one or more shims between the first ends of the bristles and the holding device, removing one or more shims from between the first ends of the bristles and the holding device, or combinations thereof.

In accordance with another exemplary embodiment of the present invention, a method of adjusting a pinch point diameter of brush sealing system is disclosed. The method includes removing a detachable fastening device coupled to the holding device. The method also includes removing one or more shims disposed between the first ends of the bristles and the holding device for increasing pinch point diameter of the bristles. The detachable fastening device is then coupled to the holding device.

In accordance with another exemplary embodiment of the present invention, a brush sealing system includes a plurality of bristles, each having a first end coupled to a holding device and a second end protruding outwards from the holding device. One or more shims are disposed between the first end of each of the bristles and the holding device; wherein the shims are configured to controlling a pinch point diameter of the bristles.

DRAWINGS

These and other features, aspects, and advantages of the present invention will become better understood when the following detailed description is read with reference to the accompanying drawings in which like characters represent like parts throughout the drawings, wherein:

FIG. 2 is a diagrammatical view of a brush seal in accordance with the aspects of FIG. 1;

FIG. 3 is a diagrammatical view of a first plate in accordance with the aspects of FIG. 2;

DETAILED DESCRIPTION

As discussed in detail below, embodiments of the present invention provide a method of manufacturing a brush sealing system including coupling a first end of each of a plurality of bristles into a holding device with a second end of each of the plurality of bristles protruding outwards from the holding device. The exemplary method includes disposing one or more shims between the holding device and the first ends of the plurality of bristles. In accordance with certain exemplary embodiments of the present invention, a method of adjusting a pinch point diameter of a brush sealing system is disclosed. In accordance with certain other embodiments of the present invention, an exemplary brush sealing system is disclosed. In accordance with exemplary embodiments of the present invention, the final design pinch point diameter of the brush sealing system may be determined later in the fabrication process. The exemplary fabrication technique facilitates flexibility in determination of pinch point diameter of the brush sealing system. This allows for the fabrication cycle/process to be initiated without complete knowledge of the final seal design. As a result, the risk involved with fixing the pinch point incorrectly on the seal is mitigated. Seal fabrication time is substantially reduced. Stiffness of the exemplary sealing system is improved, and the leakage through the seal is also decreased. Specific embodiments of the present invention are discussed below referring generally to FIGS. 1-6.

Figure 1:
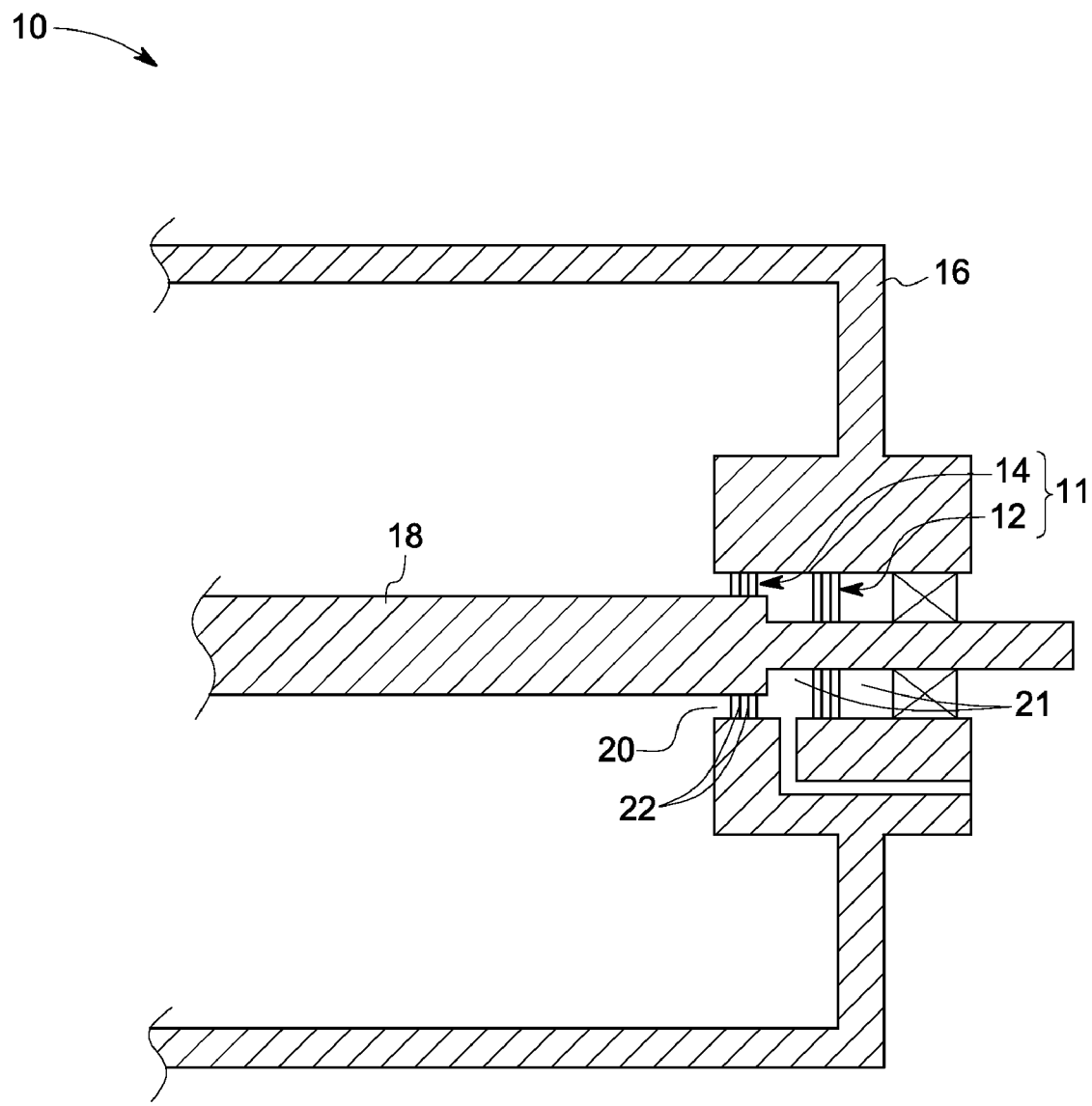
FIG. 1 is a diagrammatical view of rotary machine, e.g., an electrical generator including a plurality of brush seals in accordance with an exemplary embodiment of the present invention.

Referring to FIG. 1, a rotary machine 10 includes an exemplary brush sealing system 11 having two brush seals 12, 14. Brush seals 12, 14 are used for reducing leakage of a fluid across a pressure drop in the machine. Brush seals are typically employed between two machine components, such components being relatively rotating or non-rotating and/or relatively moving or nonmoving. One of the brush seals 12 is shown in greater detail in the subsequent figures. In accordance with aspects of the present invention, the brush seal 14 is similar or generally identical to the brush seal 12, and the description of the brush seal 12 below also serves a description of the brush seal 14. In the illustrated embodiment, the rotary machine 10 is an electric generator. In other examples, without limitation, the rotary machine 10 may be a centrifugal compressor, or a steam turbine, or a gas turbine, or a bearing, or a sump, or the like. It may also be noted that the aspects of the present invention are not limited to an association with the rotary machine and may be associated with other machines subjected to fluid pressure drop during machine operation.

In the illustrated embodiment, the rotary machine 10 includes a stator 16, and a rotor 18 coaxially aligned with the stator 16. The rotor 18 is radially spaced apart from the stator 16 to define a gap 20 between the stator 16 and the rotor 18. Although in the illustrated embodiment, the stator 16 circumferentially surrounds the rotor 18, certain other applications require the rotor to circumferentially surround the stator as known to those skilled in the art. A fluid 21 is disposed in the gap 20 in such a way that the fluid 21 has a pressure drop generally transverse to the gap 20. The pressure drop is generated during operation of the machine 10. The brush seal 12 in accordance with aspects of the present invention includes a plurality of bristles 22 configured to contact the rotor 18 to reduce leakage of fluid and also reduce temperature at a seal-rotor interface. The brush seal 12 is explained in greater detail with respect to subsequent figures below.

Referring to FIG. 2, an exemplary brush seal 12 in accordance with the aspects of FIG. 1 is illustrated. The brush seal 12 includes a holding device 24 coupled to the stator 16 (shown in FIG. 1). The plurality of bristles 22 is coupled to the holding device 24. In one embodiment, the plurality of bristles 22 comprise metallic bristles. Examples of metals used for the bristles may include Haynes 25™ alloy (a cobalt-base alloy), Inconel X750™ alloy (a nickel-base alloy), or the like. In another embodiment, the bristles comprise non-metallic bristles. Non-metallic bristles may include filament-yarn bristles, ceramic-wire bristles, or the like. Examples of filament-yarns used for bristles may include aramid filament yarns, polyester filament yarns, carbon fibers, or the like. An example of a ceramic used for bristles is silicon carbide. Typically, the bristles 22 may be canted at an angle such as, for example, a forty-five degree angle. As known to those skilled in the art, the canting of bristles 22 improves the compliance of the seal with the rotor 18.

Each bristle 22 includes a first end 26 coupled to the holding device 24 and a second end 28 disposed proximate to the rotor. In certain exemplary embodiments, the second end 28 of the bristle 22 is configured to contact the rotor. In the illustrated embodiment, the holding device 24 includes a first plate (front plate) 30, and a second plate (back plate) 32. In certain exemplary embodiments, the first and second plates 30, 32 include a metallic material, or a composite material, or a combination thereof. The bristles 22 are clamped between the first and the second plates 30, 32. The first end 26 of each bristle 22 is clamped between the plates 30, 32 and the second end 28 protrudes from the plates 30, 32 towards the rotor.

In the illustrated embodiment, the first plate 30 includes a thick portion 34 and a thin portion 36. The second plate 32 also includes a thick portion 38 and a thin portion 40. The bristles 22 are clamped between an inner face 42 of the thick portion 34 of the first plate 30 and an inner face 44 of the thin portion 40 of the second plate 32. A detachable fastening device 46 is disposed passing through holes 50, 52 respectively provided in the thick portions 34, 38 of the plates 30, 32. The fastening device 46 is configured to detachably hold the first plate 30 against the second plate 32. The fastening device 46 may include a nut and bolt, or screw, or other suitable devices known to those skilled in the art. In another exemplary embodiment, instead of using a fastening device, the first plate 30 may be fastened to the second plate 32 and the bristle pack 22 via a mechanical assembly to a machine housing.

As illustrated in FIG. 3, a plurality of fastening devices 46 may be provided along a circumferential direction to detachably couple the first plate 30 against the second plate 32. As a result, bristles 22 are clamped between the plates 30, 32. The provision of fastening devices 46 facilitates easy dissembling of the brush seal 12 during later fabrication stages and post fabrication stages. In the illustrated embodiment of FIG. 2, one or more shims (circumferential shims) 54 are disposed between the first end 26 of each of the bristles 22 and the holding device 24. The shims 54 are configured to control/adjust pinch point diameter of the bristles 22. The "Pinch Point" dimension of the seal is defined as the diameter of the bristle pack that intersects with the innermost diametral dimension (that is, closest to the rotor) of the shim 54. In conventional systems, the end portion 26 of the bristles 22 is the original pinch point of the bristle pack. In the present exemplary embodiment, once the shim 54 is inserted, the modified pinch point becomes the diameter 27 on the bristles 22 in FIG. 2. Lo represents bristle length in conventional sealing systems. Lm represents modified bristle length in the exemplary embodiment. It should be noted herein that bristle length refers to length of the bristles from the bristle tip to the pinch point. It should be noted herein that determination of the pinch point diameter of the brush seal is important from the point of view that it affects the seal's stiffness and heat generation capability. The shims 54 may include a metallic material, non-metallic material, or combinations thereof.

In one embodiment, during a post fabrication stage, if there is a requirement for adjusting a pinch point diameter of the bristles 22, the fastening device 46 is removed and the first plate 30 is detached from the back plate 32. The combined thickness of the shim or shims is altered to change the pinch point diameter. For example, a thicker shim or additional shims may be disposed proximate the first ends 26 of the bristles 22 to reduce the pinch point diameter of the bristles 22. The first plate 30 is then coupled to the second plate 32 using the fastening device 46. The pinch point diameter of the bristles is inversely proportional to the thickness of the shims or the number of shims. When the thickness of the shims is increased or the number of shims is increased, the pinch point diameter of the bristles is reduced. When the thickness of the shims is reduced or the number of shims is reduced, the pinch point diameter of the bristles is increased. In one embodiment, the shims may be integrated to the first plate 30.

The conventional manufacturing cycle for a brush seal typically occurs over several weeks. During such a manufacturing cycle of a brush seal, various parameters such as a pinch point diameter of the brush seal need to be set during early stages of the design process. If during the later stages of fabrication, any design changes are requested, the seal cannot be altered and the customer is restricted by the original design parameter. In accordance with the embodiments of the present invention, the provision of shims between detachable holding device and bristles facilitates flexibility in adjusting pinch point diameter within the brush seal. The front plate is removable because of a detachable design. The pinch point diameter may then be altered as required by the end user through the use of circumferential shims. In accordance with the embodiments of the present invention, flexibility in adjusting pinch point diameter of the brush seal facilitates the fabrication cycle/process to be initiated without complete knowledge of the final seal design. The risk involved with fixing the pinch point diameter incorrectly on the brush seal is mitigated.

Figure 4:
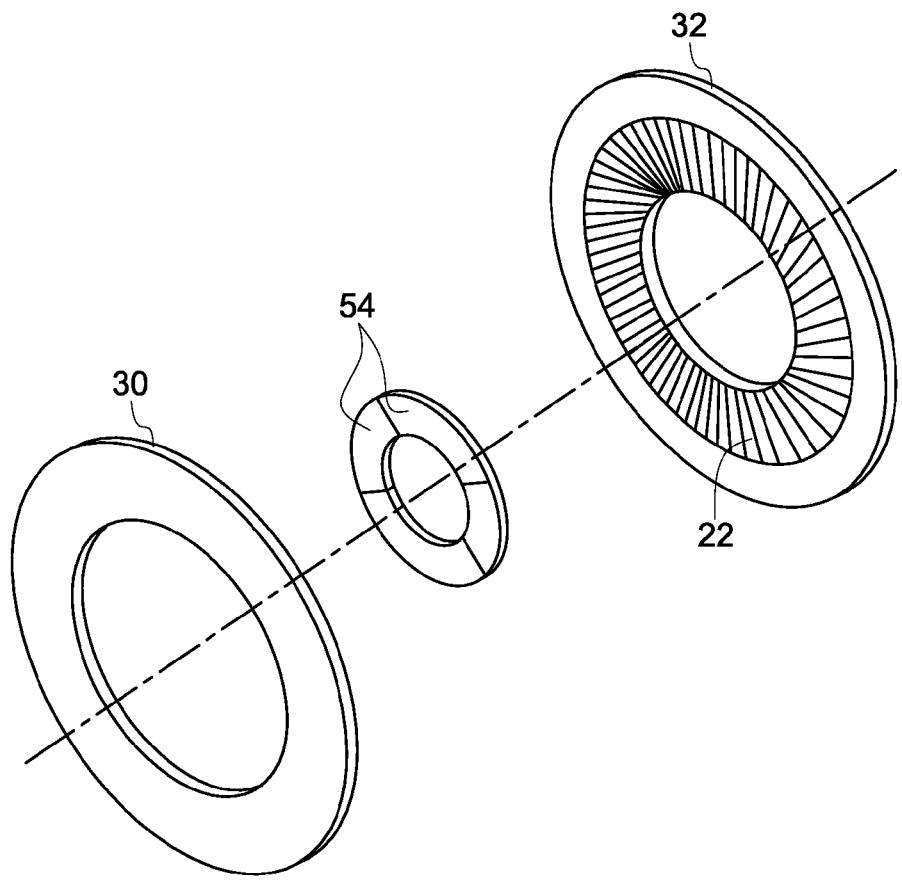
FIG. 4 is a diagrammatical view of a plate and shim embodiment in accordance with the aspects of FIG. 2.

FIG. 4 illustrates an exemplary plate and shim embodiment in accordance with the aspects of FIG. 2. As discussed previously, bristles are clamped between the first and the second plates 30, 32. In the illustrated embodiment, four shim segments 54 are disposed between the bristles and the first and second plates 30, 32. Each shim segment 54 is a 90-degree arc segment. In the illustrated embodiment all the four shim segments 54 have uniform thickness. It should be noted herein that even though four shim segments are illustrated, the number should be construed as a non-limiting example. In other embodiments, the number of shim segments may vary depending upon the application. The shims 54 are configured to control/adjust pinch point diameter of the bristles 22.

Figure 5:
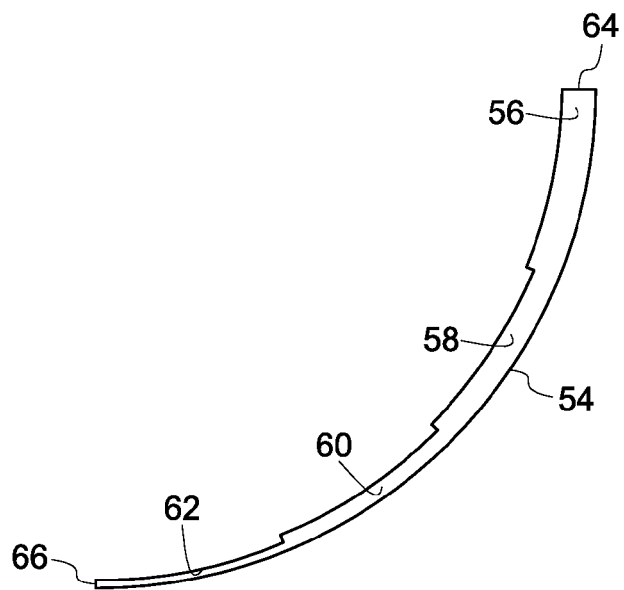
FIG. 5 is a diagrammatical view of a shim segment having varying thickness in accordance with an exemplary embodiment of the present invention.

Referring to FIG. 5, an exemplary shim segment 54 in accordance with another exemplary embodiment of the present invention is illustrated. The illustrated shim segment 54 has varying thickness compared to the embodiment illustrated in FIG. 3. The shim segment 54 is a 90-degree arc segment. The exemplary shim segment 54 includes four sections 56, 58, 60 and 62 having variable thickness. The thickness of the shim segment decreases from one end 64 towards the other end 66. In some other embodiments, the thickness may decrease from the other end 66 towards one end 64. In certain other embodiments, the number of sections of the shim segment may vary depending on the application. In some embodiments, four such shim segments having varied thickness may be disposed between the holding device and the bristles. In other embodiments, the number of such shim segments may vary depending upon the application. Usage of shim segments having varied thickness or varying the number of shim segments permits varying stiffness along a circumferential direction of the plurality of bristles. For example, moving along a clockwise direction around the circumference of the seal, the local stiffness of the bristles may be varied as a function of location of shim segments within the circumference. For example, in one quadrant, the bristles may have stiffness of 90 lb/inch, in another quadrant the bristles may have a stiffness of 180 lb/inch, and so forth.

In certain other embodiments, a combination of shim segments having uniform thickness and shim segments having varied thickness may be used. In one example, two shim segments having uniform thickness and two shim segments having varied thickness may be used. In another example, three shim segments having uniform thickness and one shim segment having varied thickness may be used. Any number of such permutations and combinations are envisaged.

Figure 6:
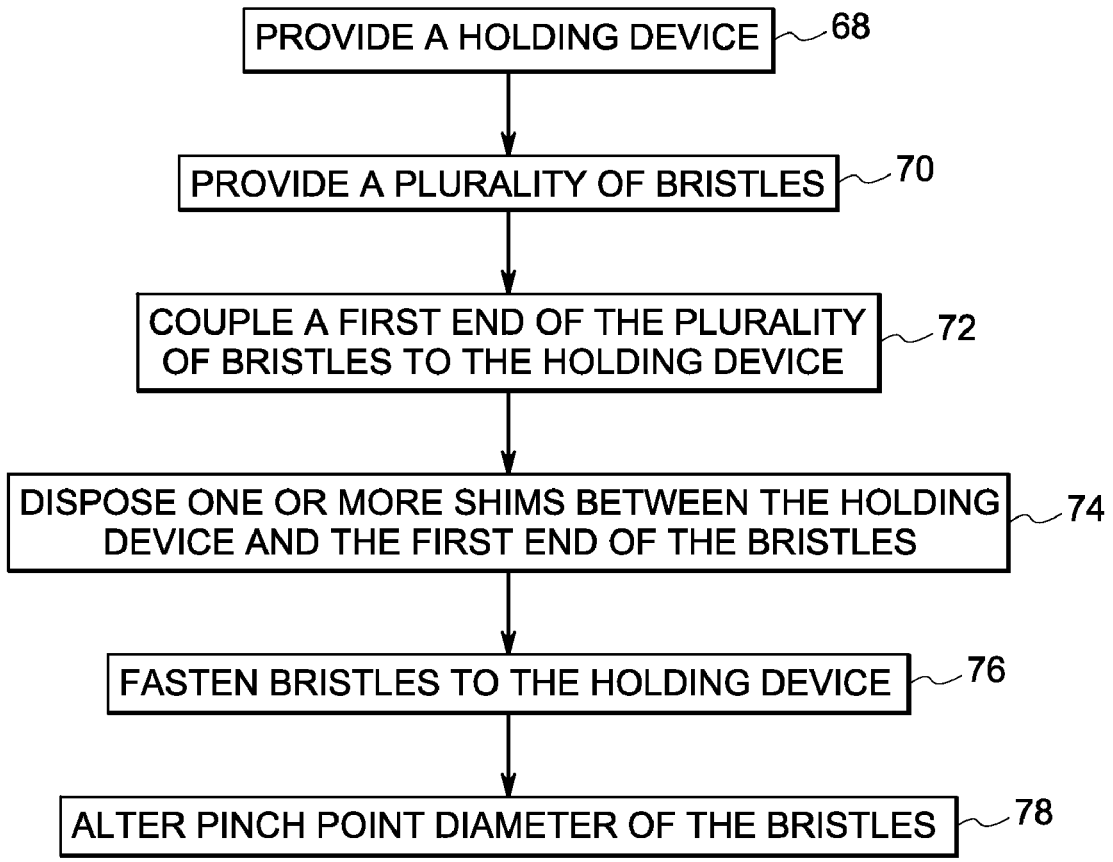
FIG. 6 is a flow chart illustrating exemplary steps involved in a method of manufacturing a brush seal in accordance with an exemplary embodiment of the present invention.

Referring to FIG. 6, a flow chart illustrating exemplary steps involved in a method of manufacturing a brush seal in accordance with an exemplary embodiment of the present invention is illustrated. The method includes providing a holding device as represented by the step 68. In the illustrated embodiment, the holding device 24 includes a first plate (front plate) 30, and a second plate (back plate) 32. The method also includes providing a plurality of bristles as represented by the step 70. A first end 26 of each bristle 22 is coupled to the holding device 24 and a second end 28 disposed proximate to the rotor as represented by the step 72. In certain exemplary embodiments, the second end 28 of the bristle 22 is configured to contact the rotor. The bristles 22 are clamped between the first and the second plates 30, 32. The first end 26 of each bristle 22 is clamped between the plates 30, 32 and the second end 28 protrudes from the plates 30, 32 towards the rotor.

The method also includes disposing one or more shims (circumferential shims) 54 between the first end 26 of each of the bristles 22 and the holding device 24 as represented by the step 74. The shims 54 are configured to control/adjust pinch point diameter of the bristles 22. The bristles 22 are clamped between an inner face 42 of the thick portion 34 of the first plate 30 and an inner face 44 of the thin portion 40 of the second plate 32. The method further includes disposing a detachable fastening device 46 passing through holes 50, 52 respectively provided in the thick portions 34, 38 of the plates 30, 32. As a result, bristles 22 are fastened against the holding device as represented by the step 76. The fastening device 46 is configured to detachably hold the first plate 30 against the second plate 32. The pinch point diameter of bristles is altered due to the provision of shims as represented by the step 78.

In one embodiment, the thickness of the shims or the number of shims disposed between the bristles and the holding device are increased to reduce pinch diameter of bristles during later stages of fabrication and post fabrication stages of the brush seal. In such an embodiment, the fastening device 46 is removed from the holding device 24, a predetermined number of shims of predetermined dimensions is disposed between the bristles 22 and the holding device 24 for reducing the pinch point diameter of the bristles 22. The fastening device 46 is then again coupled to the holding device 24. In another embodiment, the thickness of the shims or the number of shims disposed between the bristles and the holding device are reduced to increase pinch diameter of bristles during later stages of fabrication and post fabrication stages of the brush seal. In such an embodiment, the fastening device 46 is removed from the holding device 24, a predetermined number of shims of predetermined dimensions disposed between the bristles 22 and the holding device 24 is removed for increasing the pinch point diameter of the bristles 22. The fastening device 46 is then again coupled to the holding device 24. In another embodiment, shims having varied thickness may be disposed between the bristles and the holding device to vary stiffness along a circumferential direction of the plurality of bristles.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacturing a brush sealing system; comprising:
   coupling a first end of each of a plurality of bristles into a holding device with a second end of each of the plurality of bristles protruding outwards from the holding device;
   disposing one or more shims between the holding device and the first ends of the plurality of bristles; and
   varying a thickness or number of shims along a circumference so as to vary stiffness along a circumferential direction of the plurality of bristles.

2. The method of claim 1 wherein the holding device comprises a first plate and a second plate configured to hold the plurality of bristles.

3. The method of claim 2 further comprising coupling the first plate to the second plate through a removable fastening device.

4. The method of claim 1 further comprising later increasing a thickness or number of shims disposed between the holding device and the first end of each of the plurality of bristles for reducing the pinch point diameter of the bristles.

5. The method of claim 1 further comprising later reducing a thickness or number of shims disposed between the holding device and the first end of each of the plurality of bristles for increasing pinch point diameter of the bristles.

6. A method of adjusting a pinch point diameter of a brush sealing system comprising a plurality of bristles having first ends coupled to a holding device and second ends protruding outwards from the holding device, the method comprising:
   altering the pinch point diameter of the plurality of bristles by adding one or more shims between the first ends of the bristles and the holding device, removing one or more shims from between the first ends of the bristles and the holding device, or combinations thereof, and
   varying a thickness or number of shims along a circumference so as to vary stiffness along a circumferential direction of the plurality of bristles.

7. The method of claim 6 further comprising, prior to altering the pinch point diameter, removing a detachable fastening device coupled to the holding device and, after altering the pinch point diameter, coupling the detachable fastening device to the holding device.

8. The method of claim 6 wherein altering comprises reducing the number of shims disposed between the holding device and the first ends of the bristles for increasing pinch point diameter of the bristles.

9. The method of claim 6 further comprising increasing a thickness or number of shims disposed between the holding device and the first ends of the plurality of bristles for reducing pinch point diameter of the bristles.

10. A method of adjusting a pinch point diameter of a brush sealing system comprising a plurality of bristles having first ends coupled to a holding device and second ends protruding outwards from the holding device, the method comprising:
   removing a detachable fastening device coupled to the holding device;
   removing one or more shims disposed between the first ends of the bristles and the holding device for increasing pinch point diameter of the bristles;
   varying a thickness or number of shims along a circumference so as to vary stiffness along a circumferential direction of the plurality of bristles; and
   coupling the detachable fastening device to the holding device.

11. The method of claim 10 wherein removing the one or more shims reduces the number of shims disposed between the holding device and the first ends of the bristles for increasing pinch point diameter of the bristles.

12. A brush sealing system comprising:
   a plurality of bristles, each having a first end coupled to a holding device and a second end protruding outwards from the holding device; and
   one or more shims disposed between the first end of each of the bristles and the holding device; wherein a thickness or number of shims along a circumference is varied so as to vary stiffness along a circumferential direction of the plurality of bristles; wherein the shims are configured to controlling a pinch point diameter of the bristles.

13. The system of claim 12 wherein the one or more shims comprises a metallic material; non-metallic material; or combinations thereof.

14. The system of claim 12 further comprising a detachable fastening device coupled to the holding device and configured to detachably hold the plurality of bristles against the holding device.

15. The system of claim 12 wherein the plurality of bristles comprise metallic bristles.

16. The system of claim 12 wherein the plurality of bristles comprise non-metallic bristles.

* * * * *